United States Patent Office 3,738,993
Patented June 12, 1973

3,738,993
BENZIMIDAZOLYL SULFIDES AND SULFONES
Rudiger D. Haugwitz, Highland Park, and Venkatachala L. Narayanan, Hightstown, N.J., assignors to E. R. Squibb & Sons, Inc., New York, N.Y.
No Drawing. Filed Mar. 4, 1971, Ser. No. 121,159
Int. Cl. C07d 49/38
U.S. Cl. 260—309.2                    4 Claims

ABSTRACT OF THE DISCLOSURE

1 - alkylthioalkyl- and 1 - alkylsulfonylalkyl-benzimiazoles are provided which are useful as anthelmintics.

---

This invention relates to benzimidazolyl sulfides and sulfones of the structure

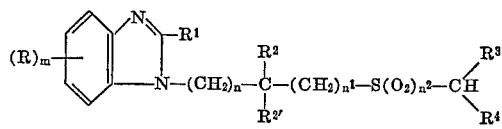

wherein R can be hydrogen, hydroxy, lower alkoxy, amino, alkylamino, carbamate ester (—NHCOOR$^5$), lower alkyl, nitro, thiocyanato, halo, aryl-lower alkyl, mercapto, aryl, lower alkyl aryl; $R^1$, $R^2$, $R^{2'}$, $R^3$ and $R^4$ are the same or different and can be hydrogen, lower alkyl, arylalkyl, aryl, or substituted aryl, $R^5$ is lower alkyl, aryl or cycloalkyl, $m$ is 1 or 2, $n$ is 0 or 1, and $n^1$ is 0 to 4, $n+n^1$ is 4 or less and $n^2$ is 0 or 1.

The lower alkyl groups represented by the symbols R, $R^1$ and $R^2$ are straight or branched chain aliphatic hydrocarbon radicals having up to seven carbon atoms, such as methyl, ethyl, propyl, isopropyl, butyl, isobutyl, t-butyl, amyl, hexyl, heptyl and the like. The lower alkyl groups represented by $R^3$ and $R^4$ are of the kind mentioned with respect to R, $R^1$ and $R^2$ except that they have from one to about five carbon atoms.

1-alkylthioalkyl- and 1-alkylsulfonylalkyl-benzimidazoles are provided which are useful as anthelmintics.

With respect to R, the lower alkoxy groups represented thereby include straight and branched chain radicals of up to seven carbon atoms, corresponding to the above R, $R^1$, $R^2$, $R^{2'}$ alkyl groups, e.g., methoxy, ethoxy, propoxy, isopropoxy and the like. R can include each of the four halogens but chlorine and bromine are preferred. The amino groups can be substituted and include mono- or di-lower alkylamino wherein lower alkyl is as defined above containing from one to about seven carbon atoms, such as methylamino, ethylamino, isopropylamino, heptylamino, dimethylamino, diethylamino, methylethylamino, methylbutylamino, ethyl 1-propylamino, as well as derivatives from halocarbonate esters,

wherein X is bromine or chlorine and $R^5$ is as defined herebefore.

The term "aryl" includes monocyclic or bicyclic monovalent or bivalent aromatic ring systems such as phenyl or naphthyl, phenylene or naphthylene. These aryl radicals can include as substituents hydroxy or any of the lower alkyl groups included within the definition of R, $R^1$, $R^2$, $R^{2'}$, $R^3$ and $R^4$.

It is to be understood that where more than one R substituent is present, each R may be the same or different.

Preferred are those compounds wherein R, $R^1$, $R^2$, $R^{2'}$, $R^3$ and $R^4$ are hydrogen, and $n$ is 0 and $n^1$ is 1 and $n^2$ is 0 or 1.

Exemplary of compounds falling within the present invention include but are not limited to the following set out in Table A below:

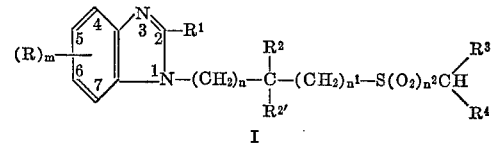

I

TABLE A

| | R (position) | R$^1$ | R$^2$ | R$^{2'}$ | R$^3$ | R$^4$ | m | n | n$^1$ | n$^2$ |
|---|---|---|---|---|---|---|---|---|---|---|
| 1 | NO$_2$(5) | CH$_3$ | H | H | H | CH$_3$ | 1 | 1 | 0 | 1 |
| 2 | Cl(5) | CH$_3$ | H | H | H | CH$_3$ | 1 | 1 | 0 | 1 |
| 3 | NO$_2$(6) | CH$_3$ | H | H | H | CH$_3$ | 1 | 1 | 0 | 1 |
| 4 | H | C$_2$H$_5$ | H | H | H | H | 1 | 0 | 0 | 1 |
| 5 | OH(7) | CH$_2$C$_6$H$_5$ | H | H | H | H | 1 | 0 | 1 | 1 |
| 6 | C$_2$H$_5$(5) | ⟨C$_6$H$_4$OH⟩ | H | H | H | —C$_6$H$_4$—CH$_3$ | 1 | 1 | 0 | 1 |
| 7 | H | —CH(CH$_3$)$_2$ | H | H | H | C$_6$H$_5$ | 1 | 1 | 0 | 1 |
| 8 | CH$_3$(5,6) | C$_2$H$_5$ | CH$_3$ | H | C$_6$H$_5$ | H | 2 | 1 | 0 | 1 |
| 9 | CH$_3$NH(6) | CH$_3$ | H | CH$_3$ | H | CH$_3$ | 1 | 0 | 1 | 1 |
| 10 | CH$_3$O(5,6) | CH$_3$ | H | H | H | C$_2$H$_5$ | 2 | 1 | 1 | 1 |
| 11 | Cl(6) | CH$_3$ | H | H | H | CH$_3$ | 1 | 1 | 0 | 0 |
| 12 | NO$_2$(5) | CH$_3$ | H | H | H | CH$_3$ | 1 | 1 | 0 | 0 |
| 13 | Br(5) | H | CH$_3$ | H | H | —C$_6$H$_4$—Cl | 1 | 0 | 0 | 0 |
| 14 | CH$_3$OC(O)—NH(5) | H | CH$_3$ | H | H | H | 1 | 1 | 0 | 0 |
| 15 | —SCN(5) | C$_4$H$_9$ | C$_6$H$_5$ | C$_6$H$_5$ | C$_6$H$_5$CH$_2$— | H | 1 | 2 | 1 | 1 |
| 16 | NH$_2$(6) | H | —C$_6$H$_4$—CH$_3$ | H | C$_3$H$_7$ | C$_3$H$_7$ | 1 | 1 | 1 | 1 |
| 17 | C$_6$H$_5$CH$_2$(5) | C$_5$H$_{11}$ | C$_2$H$_5$ | C$_2$H$_5$ | CH$_3$—⟨C$_6$H$_4$⟩— | H | 1 | 1 | 3 | 0 |
| 18 | —SH(6) | C$_6$H$_5$ | C$_3$H$_7$ | C$_6$H$_{13}$ | H | H | 1 | 2 | 2 | 1 |

Compounds of Formula I are prepared by reacting a benzimidazole II with a haloalkylsulfide III (wherein X is Cl or Br), in the presence of a metal alkoxide, e.g., sodium methoxide or potassium ethoxide, to furnish the sulfide IV:

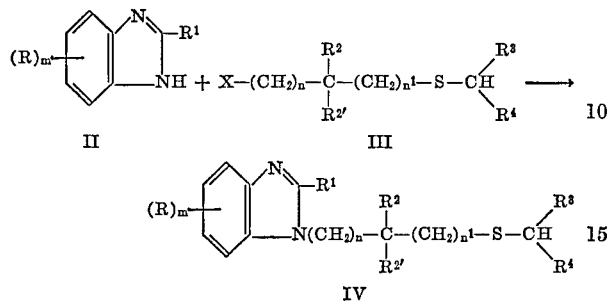

Molar ratios of II to III can vary from about 1:1 to about 1:10. Protic or aprotic solvents such as alkanols, acetone or benzene, can be utilized. The reaction is carried out at temperature within the range of about 0° to about 120° for periods of about 30 minutes to 24 hours.

Alternatively, IV can be synthesized from o-phenylenediamines V and carboxylic acids VI employing a molar ratio of V:VI within the range of from about 1:1 to about 1:5. This cyclization is commonly referred to as Phillip's benzimidazole synthesis (Journal of the Chemical Society, 1928, 2393).

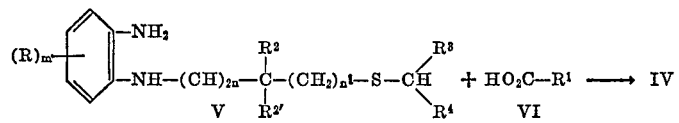

The sulfide IV is then oxidized via the sulfoxide (VII) to the sulfone (I) (where $n^2$ is 1) in accordance with the following reactions:

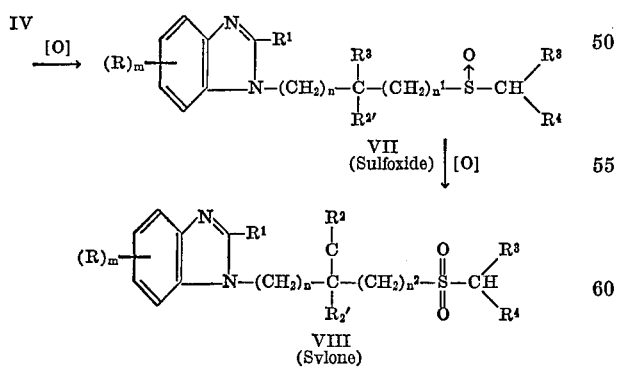

Oxidizing agents which can be employed in the above oxidations include organic and inorganic oxidizing agents such as hydrogen peroxide, m-chloro-perbenzoic acid, peracetic acid and potassium permanganate as well as any of the oxidizing agents mentioned in The Organic Chemistry of Sulfur, C. M. Suter, 658–773, J. Wiley and Sons, N.Y. 1949.

The above oxidations can be carried out in the presence of a solvent; when peracids or hydrogen peroxide are employed, acetic acid, acetone or chloroform can be used; where potassium permanganate is used, dilute sulfuric acid, ethanol, carbon tetrachloride, water or benzene can be employed as a solvent.

The above oxidations can be carried out at temperatures ranging from about 0 to about 100° C. for periods ranging from about one to about twenty-four hours.

The oxidizing agent is employed in a ratio (equivalents) to the sulfide IV within the range of from about 2:1 to about 10:1 to form the sulfoxide V and subsequently the sulfone I.

The starting benzimidazole II can be prepared by reacting an o-phenylenediamine of the structure

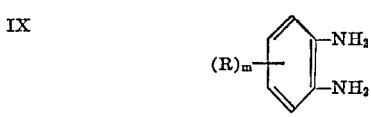

with a carboxylic acid VI in accordance with the Phillip's benzimidazole synthesis mentioned hereinbefore.

Examples of suitable o-phenylenediamines and carboxylic acids are set out in Table B.

TABLE B $(R)_m$ — benzene ring with positions 3,4,5,6,2,1 — $NH_2$, $NH_2$ ; $HO_2C—R^1$

| R (position) | m | R¹ |
|---|---|---|
| 1. H | — | (a). H |
| 2. HO (4) | 1 | (b). $C_4H_9$ |
| 3. HO (4, 5) | 2 | (c). $CH_3$ |
| 4. $C_2H_5O—$ (5) | 1 | (d). $C_5H_{11}$ |
| 5. $—NH_2$ (5) | 1 | (e). $C_6H_5C_2H_4—$ |
| 6. $—CH_3NH$ (6) | 1 | (f). $C_6H_5$ |
| 7. $—C_4H_9NH$ (4) | 1 | (g). HO—C₆H₄— |
| 8. $—NHCOOCH_3$ (5) | 1 | (h). CH₃—C₆H₄— |
| 9. $—NHCOOC_6H_5$ (4) | 1 | |
| 10. $—NHCOO—$⟨S⟩ (5) | 1 | |
| 11. $\{CH_3 (3), C_2H_5 (5)\}$ | 2 | |
| 12. $C_4H_9$ (5) | 1 | |
| 13. $NO_2$ (4, 5) | 2 | |
| 14. $—SCN$ (6) | 1 | |
| 15. Cl (4, 5) | 2 | |
| 16. $C_6H_5CH_2—$ (4) | 1 | |
| 17. $—SH$ (5, 6) | 2 | |
| 18. $C_6H_5$ (3) | 1 | |
| 19. $CH_3—C_6H_4—$ (4) | 1 | |

The starting o-phenylenediamines of structure V can be prepared by reacting an o-nitroaniline X
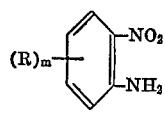

with a haloalkyl sulfide III to form a compound of the structure

XI
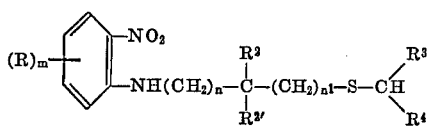

and thereafter reducing compound XI to the corresponding diamine V.

Examples of suitable o-nitroanilines of the Formula X are starting materials for the o-phenylenediamines set out in Table B.

It is to be noted that the starting o-nitroaniline and o-phenylenediamine compounds need not contain R substituents; the R substituents can be added to the benzimidazole starting material II, to the o-phenylenediamine V or to the o-nitroaniline IX in accordance with techniques well known in the art.

The compounds of Formula I form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic or organic acid. Illustrative are the hydrohalides, especially the hydrochloride and hydrobromide which are preferred, sulfate, nitrate, phosphate, oxalate, tartrate, maleate, fumarate, citrate, succinate, methanesulfonate, benzenesulfonate, toluenesulfonate, and the like.

The benzimidazolyl sulfides and sulfones described herein have anthelmintic activity and are useful in the treatment and/or prevention of helminthiasis, a parasitic disease which causes widespread and often serious infection in domesticated animals such as swine, horses, cattle, sheep and goats. In treating domesticated animals, the compounds may be mixed with a nontoxic, edible carrier to form a feed supplement which is then incorporated in the animal feed in the desired concentration, or they may be administered in unit dosage forms which, in the case of large domesticated animals, take the form of boluses, or in the form of a liquid drench. Alternatively, water-soluble salts or a dispersable, wettable powder containing the anthelmintic agent may be added to the drinking water of the animals.

The preferred dosage level for treating a helminth infection will depend to a large extent on the particular sulfonyl benzimidazolyl sulfide and sulfone being employed, on the severity of the infection and on the particular species of animal to be treated. In general, the benzimidazolyl sulfides and sulfones exhibit anthelmintic activity when administered to animals in a daily dose of about 50 to about 300 mg. per kilogram of animal body weight. It is preferred to employ in the range of 100–200 mg. per kilogram of body weight per day. The compounds may be given in a single dose or divided into a plurality of smaller doses. If desired, the course of treatment may be extended over a period of days in which case the optimum daily dose level may be lowered. When the compounds are to be employed primarily as prophylactic agents for the prevention of helminthic infections, the preferred daily dose level is, of course, lower than the therapeutic level is, preferably in the range of about 10–70 mg. per kilogram of body weight. The benzimidazolyl sulfides and sulfones may be incorporated in the animal feeds, and this method of administration is preferred when the compounds are to be used prophylactically, in which case they are incorporated in the feeds at concentrations such that the animal will consume daily from about 10 to about 70 mg. of sulfonyl benzimidazolyl sulfide or sulfone per kilogram of body weight.

The means employed for administering these benzimidazolyl sulfides and sulfones to animals are not critical, and any of the methods now used or available for treating animals infected with or susceptible to parasitic infections are satisfactory. When these substances are employed therapeutically to treat an established infection, they are conveniently administered in a unit dosage form such as in a capsule, bolus, tablet, or as a liquid drench. It will be noted that all of these methods contemplate oral administration since this is the most effective method of treating the worm-infested stomach or intestinal tract.

When the benzimidazolyl sulfides ar sulfones are to be administered in unit dosage form, capsules, boluses or drenches containing the desired amount of anthelmintic distributed in a pharmaceutically acceptable vehicle are usually employed. These are prepared by intimately and uniformly mixing the active ingredient with suitable finely divided diluents, suspending agents, fillers, disintegrating agents and/or binders such as starch, lactose, talc, magnesium stearate, vegetable gums and the like. These unit dosage formulations may be widely varied with respect to their total weight and content of anthelmintic agent, depending on factors such as the type of host animal to be treated, the dose level desired, and the severity and type of parasitic infestation. For large animals such as sheep, swine or cattle, boluses weighing up to 15 grams may be used, although it is preferred to employ boluses weighing from 2–10 grams and containing from 1–5 grams of the anthelmintic agent. These boluses, as well as smaller size tablets, contain binders and lubricants, and are compounded by techniques known in this art. Capsules are readily prepared by mixing the active ingredient with a diluent such as starch or lactose and filling into the capsule.

In order to treat infected animals by means of a drench, the benzimidazolyl sulfides or sulfones are mixed with a suspending agent such as bentonite and the solid product added to water just prior to administration. The preferred drenches in accordance with this invention contain from about 5–50% by weight of sulfonyl benzimidazole compound.

The benzimidazolyl sulfides or sulfones described herein may also be administered as a component of the feed of the animals or dissolved or suspended in the drinking water. According to this invention, novel feed and feed supplement compositions are provided in which compounds of Formula I above are present as an active anthelmintic ingredient. Such compositions comprise the benzimidazolyl sulfides or sulfones intimately dispersed in or admixed with an inert carrier or diluent, i.e. one that is nonreactive with respect to the benzimidazolylsulfide or sulfone and that may be administered with safety to the animals. The carrier or diluent is preferably one that is or may be an ingredient of the animal ration.

In the feed supplement compositions the active ingredient is present in relatively large amounts. These supplements are suitable for addition to the feed either directly or after an intermediate dilution or blending step. Examples of carriers or diluents suitable for such compositions are solidly orally ingestible carriers such as distillers' dried grains, corn meal, citrus meal, fermentation residues, ground oyster shells, attapulgus clay, wheat shorts, molasses solubles, corn cob meal, edible vegetable substances, toasted dehulled soya flour, soybean mill feed, antibiotic mycelia, soya grits, crushed limestone and the like. The anthelmintic agents are intimately dispersed or admixed throughout the solid inert carrier by methods such as grinding, stirring, milling, or tumbling. By selecting proper diluents and by altering the ratio of carrier to active ingredient, compositions of any desired concentration may be prepared. Formulations containing from about 5% to about 50% by weight, and preferably from about 10–30% by weight, of active ingredient are particularly suitable for addition to feeds. The active compound is normally dispersed or mixed uniformly in the diluent but in some instances may be sorbed on the carrier.

Feed supplements are prepared by uniformly mixing the appropriate benzimidazolyl sulfide or sulfone with the carrier or carriers. Such supplements are added to the finished animal feed in an amount adequate to give the final concentration desired for controlling or treating helminthiasis by way of the animal ration. Although the preferred level in feeds will depend on the particular compounds being employed, the anthelmintic compounds of this invention are normally fed at levels of 0.10–2.0% in the feed. One advantageous method of administering the compounds of this invention to animals whose feeds are conveniently pelleted, such as sheep, is to incorporate them directly in the pellets. For instance, benzimidazolyl sulfide or sulfone is readily incorporated in nutritionally adequate alfalfa pellets (during the pelleting operation) at levels of 0.5 to 5 grams per pound of pellets for therapeutic use, and at lower levels for prophylactic use, and such pellets fed to the worm-infested animals. Alternatively, the benzimidazolyl sulfides or sulfones may be incorporated in salt licks or salt blocks at any desired concentration (concentrations of 5–25% by weight are conveniently employed). Large animals such as sheep, cattle and goats, then receive the anthelmintics with their salt.

The following examples further illustrate the invention.

EXAMPLE 1

1-[2-(ethylthio)ethyl]-2-methylbenzimidazole

To 100 ml. of absolute ethanol there is added cautiously 1.5 g. sodium hydride. Once the reaction has ceased there is added 6.6 g. of 2-methylbenzimidazole and 7.4 g. of ethyl-2-chloroethyl sulfide. This mixture is refluxed for two hours. The solvent is evaporated, water is added and the product is repeatedly extracted with ether. Evaporation of the combined dried ether extracts furnishes an oil which upon trituration with little ether yields 0.4 g. starting material which is filtered off.

The filtrate is chromatographed over neutral alumina. Elution with chloroform/methanol (1:1) yields on evaporation of the solvents 3.6 g. of oily sulfide of the above title.

EXAMPLE 2

1-[2-(ethylsulfonyl)ethyl]-2-methylbenzimidazole

To a solution of 3.6 g. of 1-[2-(ethylthio)ethyl]-2-methylbenzimidazole prepared in Example 1 in 100 ml. of chloroform there is added in portions and with external ice-bath cooling 6.6 g. of m-chloroperbenzoic acid, 85%. After completed addition the solution is stirred for an additional 30 minutes, then the chloroform solution is washed repeatedly with 10% potassium carbonate solution. The dried organic layer yields on evaporation an oil. Trituration with ether/petroleum ether furnishes 0.6 g. of product. The filtrate is chromatographed on neutral alumina. Elution with chloroform/ether (7:3) and later, chloroform furnishes additional product, which is combined with the first crop and crystallized from chloroform/ether to yield 1.8 g. of the above title sulfone, M.P. 99–101°.

Calcd. for $C_{12}H_{15}N_2O_2S$ (percent): C, 57.16; H, 6.25; N, 11.11. Found (percent): C, 57.08; H, 6.22; N, 10.99.

EXAMPLE 3

5(and 6)-chloro-1-[2-(ethylthio)ethyl]-2-methylbenzimidazole

To a solution of 13 g. of 2-methyl-5-chlorobenzimidazole in 300 ml. of absolute ethanol there is added 3.8 g. of sodium hydride (50% mineral oil dispersion) and after five minutes of stirring 15.7 g. of ethyl-2-chloroethyl sulfide. The mixture is refluxed for 1.5 hours. Upon cooling the mixture is evaporated, treated with water and extracted with chloroform. Evaporation of the combined chloroform extracts yields 21 g. of oil of the above title.

EXAMPLE 4

5(and 6)-chloro-1-[2-(ethylsulfonyl)ethyl]-2-methylbenzimidazole

To a stirred solution of 10 g. of 5(and 6)-chloro-1-[2-(ethylthio)ethyl]-2-methylbenzimidazole in 50 ml. of chloroform there is added in portions with external ice-bath cooling 16 g. of 85% m-chloroperbenzoic acid. After completed addition the mixture is stirred for an additional 30 minutes at room temperature. The thick mixture is poured into ice water; the pH is adjusted to 10 with potassium carbonate. The organic layer is separated and the aqueous phase is extracted twice with chloroform. The combined chloroform extracts are washed with water to neutral pH, dried and evaporated. The residue is crystallized from chloroform-ether to yield 3.7 g. of the above title sulfone, M.P. 119–120°.

Calcd. for $C_{12}H_{15}ClN_2O_2S$ (percent): C, 50.26; H, 5.27; N, 9.77. Found (percent): C, 50.08; H, 5.20; N, 9.57.

EXAMPLE 5

1-[2-(ethylthio)ethyl]-2-methyl-5(and 6)-nitrobenzimidazole

To a solution of 2 g. of 56% sodium hydride-mineral oil dispersion in 300 ml. of absolute ethanol there is added 6.8 g. of 2-methyl-5-nitrobenzimidazole and 10 g. of ethyl-2-chloroethyl sulfide. The mixture is refluxed for one hour, after which there is added an additional solution of 2 g. of 56% sodium hydride-mineral oil dispersion in 80 ml. of absolute ethanol and 10 g. of ethyl-2-chloroethyl sulfide and refluxing is continued for one hour. The solvent is evaporated and the residue is diluted with water and the product extracted with ether. Evaporation of the combined, dried ether extracts furnishes a solid which is heated with 400 ml. of ether. The undissolved solid is filtered off and upon crystallization from ether furnishes 1 g. of the title compound, M.P. 105–106°.

Calcd. for $C_{12}H_{15}N_3O_2S$ (percent): C, 54.33; H, 5.70; N, 15.84. Found (percent): C, 54.43; H, 5.73; N, 15.69.

The 400 ml. of ethereal filtrate from above is concentrated to about 100 ml. of final volume of yield 5.5 g. of an isomer of the title compound M.P. 96°.

Calcd. for $C_{12}H_{15}N_3O_2S$ (percent): C, 54.33; H, 5.70; N, 15.84. Found (percent): C, 54.50; H, 5.70; N, 15.69.

EXAMPLE 6

1-[2-((ethylsulfonyl)ethyl]-2-methyl-5(or 6)-nitrobenzimidazole

To a stirred solution of 4.5 g. of 1-[2-(ethylthio)ethyl]-2-methyl-5(or 6)-nitrobenzimidazole (96° isomer), there is added in portions and with external ice-bath cooling 8.0 g. of 85% m-chloroperbenzoic acid. Upon completed addition the mixture is stirred for additional thirty minutes. To the final mixture there is added 10% aqueous potassium carbonate solution and the product is extracted with chloroform. The combined extracts are dried and upon evaporation a pinkish solid is obtained which is crystallized from methanol to yield 3.5 g. of the title compound, M.P. 151–152°.

EXAMPLE 7

1-[(methylthio)methyl]-5,6-dimethylbenzimidazole

Utilizing the procedure of Example 1 but substituting 5,6-dimethyl-benzimidazole for 2-methylbenzimidazole and methyl-1-chloromethyl sulfide for ethyl-2-chloroethyl sulfide, the above title compound is obtained.

EXAMPLE 8

1-[(methylsulfonyl)methyl]-5,6-dimethylbenzimidazole

The sulfide of Example 7 can be converted to the corresponding sulfone employing the procedure of Example 2.

EXAMPLE 9

1-[(ethylthio)methyl]-2-ethyl-5-methoxybenzimidazole

Utilizing the procedure of Example 1 but substituting 2-ethyl-5-methoxybenzimidazole for 2-methylbenzimidazole, and methyl-2-chloroethyl sulfide for ethyl-2-chloroethyl sulfide, the product is 1-[(ethylsulfonyl)methyl]-2-ethyl-5-methoxybenzimidazole.

EXAMPLE 10

1-[(ethylsulfonyl)methyl]-2-ethyl-5-hydroxy-benzimidazole

The sulfide of Example 9 can be converted to the corresponding sulfone employing the procedure of Example 6.

EXAMPLE 11

1-[(methylthio)methyl]-2-benzylbenzimidazole

Utilizing the procedure of Example 1 but substituting 2-benzylbenzimidazole for 2-methylbenzimidazole and methyl-1-chloromethyl sulfide for ethyl-2-chloroethyl sulfide the product recovered is 1-[(methylthio)methyl]-2-benzylbenzimidazole.

EXAMPLE 12

1-[(methylsulfonyl)methyl]-2-benzylbenzimidazole

The sulfide of Example 11 can be converted to the corresponding sulfone employing the procedure of Example 2.

EXAMPLE 13

1-[(propylthio)methyl]-5-butylbenzimidazole

Utilizing the procedure of Example 1 but substituting 5-butylbenzimidazole for 2-methylbenzimidazole and methyl-3-chloropropyl sulfide for ethyl-2-chloroethyl sulfide, the product recovered is 1-[(propylthio)methyl]-5-butylbenzimidazole.

EXAMPLE 14

1-[(propylsulfonyl)methyl]-5-butylbenzimidazole

The sulfide of Example 13 can be converted to the corresponding sulfone employing the procedure of Example 2.

EXAMPLES 15 TO 22

Following the procedure of Example 1 but utilizing the compounds illustrated in Table I Column A in lieu of 2-methylbenzimidazole and the compounds illustrated in Table I Column B in lieu of ethyl-2-chloroethyl sulfide, the product formed possesses the structure of Column C.

Calcd. for $C_{12}N_{15}N_3SO_4$ (percent): C, 48.47; H, 5.09; N, 14.13; S, 10.79. Found (percent): C, 48.16; H, 5.08; N, 14.45; S, 10.58.

TABLE I

| Example No. | A R (position) | A m | A R¹ | B X | B n | B R² | B R²′ | B R³ | B n′ | B R⁴ | C |
|---|---|---|---|---|---|---|---|---|---|---|---|
| 15 | —SH (5) | 1 | C₆H₁₁ | Br | 1 | H | C₂H₅ | H | 2 | C₄H₉ | As in Column A, As in Column B, As in Column B. |
| 16 | —NHCOOC₂H₅ (5) | 1 | C₆H₅ | Cl | 0 | C₄H₉ | C₆H₅ | C₆H₅ | 3 | C₆H₅ | Do. |
| 17 | —SCN (5) | 1 | p-C₂H₅—C₆H₄— | Br | 1 | p-C₂H₅—C₆H₄— | H | p-CH₃—C₆H₄— | 2 | C₂H₅ | Do. |
| 18 | —Br (5, 6) | 2 | C₄H₉ | Br | 0 | C₂H₅ | C₂H₅ | C₆H₅ | 1 | C₂H₅ | Do. |
| 19 | —C₄H₉O— (5) | 1 | H | Cl | 1 | C₆H₅ | CH₃ | H | 0 | H | Do. |
| 20 | —Cl (5) | 1 | H | Cl | 1 | CH₃ | C₆H₅ | H | 0 | C₂H₅ | Do. |
| 21 | —NHCOOC₆H₅ (5, 6) | 2 | CH₃ | Cl | 1 | CH₃ | H | C₆H₅ | 2 | C₂H₅ | Do. |
| 22 | —NH₂ (5, 6) | 2 | CH₃ | Br | 0 | CH₃ | H | C₆H₅ | 2 | CH₃ | Do. |

Column A structure: benzimidazole with (R)ₘ substituents and R¹

Column B structure: $X-(CH_2)_n-C(R^2)(R^{2'})-S-CH(R^3)(R^4)$ (with n′)

Column C structure: 1-substituted benzimidazole product

EXAMPLES 23 TO 30

The sulfides of Examples 15 to 22 can be converted to the corresponding sulfones by reacting the sulfide with m-chloroperbenzoic acid in accordance with the procedure of Example 2.

What is claimed is:

1. A compound of the formula

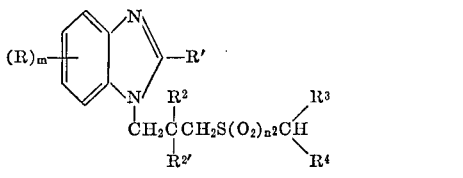

wherein R is lower alkoxy; $R^1$, $R^2$, $R^{2'}$ and $R^3$ are selected from the group consisting of hydrogen and lower alkyl; $R^4$ is selected from the group consisting of hydrogen, lower alkyl and phenyl; $m$ is selected from the group consisting of 1 and 2 and $n^2$ is selected from the group consisting of 0 and 1 or a pharmaceutically acceptable salt thereof.

2. The compound of claim 1 wherein $(R)_m$ is 5-$C_4H_9O$, $R^1$ is hydrogen, $R^2$ is propyl, $R^{2'}$ is methyl, $R^3$ is hydrogen, $R^4$ is phenyl and $n^2$ is 0.

3. A compound selected from the group consisting of

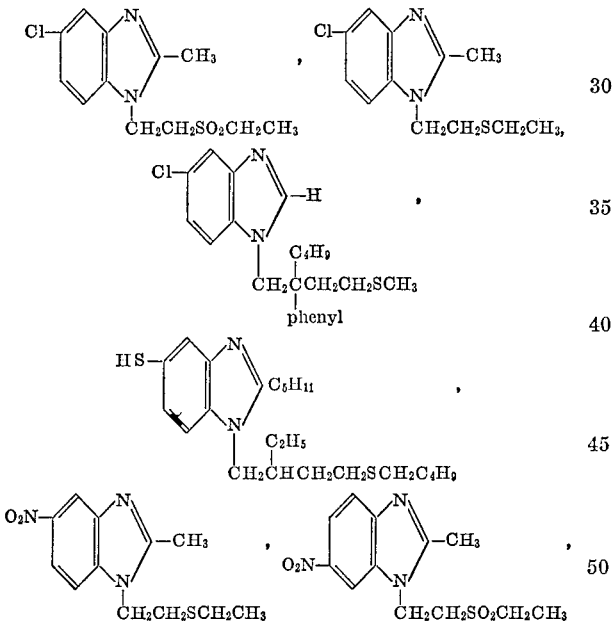

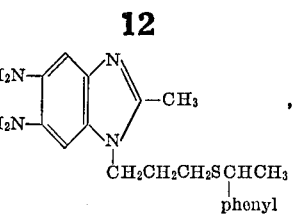

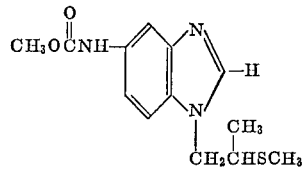

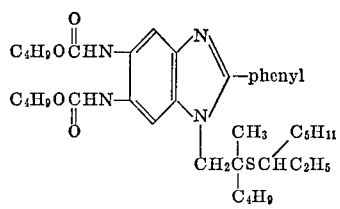

4. The compound of claim 3 having the formula

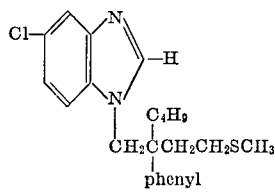

References Cited

UNITED STATES PATENTS 3,438,992   4/1969   Shen et al. _____ 260—309.2
3,444,175   5/1969   Shen et al. _____ 260—309.2

OTHER REFERENCES

Zvezdina et al.: Current Abstracts of Chemistry and Index Chemicus, Mar. 4, 1970, vol. 36, No. 9, issue 327.

Zvezdina et al.: Chem. Abst. 1970 (May 25, 1970), No. 111374f.

NATALIE, TROUSOF, Primary Examiner

U.S. Cl. X.R.

260—454, 470, 471 C, 575, 577, 578, 609 R, 609 A; 424—273

UNITED STATES PATENT OFFICE
CERTIFICATE OF CORRECTION

Patent No. 3,738,993  Dated June 12, 1973

Inventor(s) Rudiger D. Haugwitz and Venkatachala L. Narayanan

It is certified that error appears in the above-identified patent and that said Letters Patent are hereby corrected as shown below:

Column 1, line 40 and column 2, line 1, delete
--1-alkylthioalkyl- and 1-alkylsulfonylalkyl-benzimidazoles are provided which are useful as anthelmintics.--

Column 3, lines 48-55, the formula should read as follows:

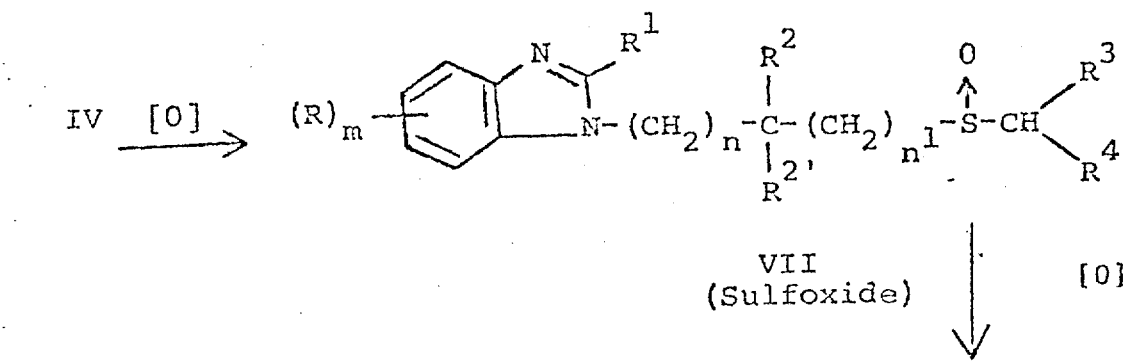

Column 3, line 63, "(Svlone)" should read --(Sulfone)--.

Column 6, line 22, "ar" should read --or--.

Column 7, line 74, "$C_{12}H_{15}N_2O_2S$" should read --$C_{12}H_{16}N_2O_2S$--.

Column 10, Table I, Section B, example 17,
"Br  1  p-$C_2H_5$--$C_6H_4$--  H  3  p-$CH_3$--$C_6H_4$--  $CH_3$"
should read
--Br  1  p-$CH_3$--$C_6H_4$--  H  3  p-$CH_3$--$C_6H_4$--  $CH_3$--

Signed and sealed this 9th day of October 1973.

(SEAL)
Attest:

EDWARD M. FLETCHER, JR.
Attesting Officer

RENE D. TEGTMEYER
Acting Commissioner of Patents